US011361762B2

(12) United States Patent
Mehta et al.

(10) Patent No.: US 11,361,762 B2
(45) Date of Patent: Jun. 14, 2022

(54) RECOMMENDING MULTIMEDIA BASED ON USER UTTERANCES

(71) Applicant: FUJITSU LIMITED, Kawasaki (JP)

(72) Inventors: Nikhil Mehta, Milpitas, CA (US); Ramya Malur Srinivasan, San Diego, CA (US); Ajay Chander, San Francisco, CA (US)

(73) Assignee: FUJITSU LIMITED, Kawasaki (JP)

( * ) Notice: Subject to any disclaimer, the term of this patent is extended or adjusted under 35 U.S.C. 154(b) by 1 day.

(21) Appl. No.: 16/719,206

(22) Filed: Dec. 18, 2019

(65) Prior Publication Data

US 2021/0193130 A1 Jun. 24, 2021

(51) Int. Cl.
*G10L 15/22* (2006.01)
*G10L 15/197* (2013.01)
(Continued)

(52) U.S. Cl.
CPC .......... *G10L 15/197* (2013.01); *G10L 15/063* (2013.01); *G10L 15/10* (2013.01);
(Continued)

(58) Field of Classification Search
CPC ..... G10L 15/197; G10L 15/063; G10L 15/10; G10L 15/22; G10L 2015/0635;
(Continued)

(56) References Cited

U.S. PATENT DOCUMENTS

2009/0254971 A1* 10/2009 Herz ................. G06Q 30/0603
726/1

2015/0347381 A1* 12/2015 Bellegarda ............ G06F 40/274
704/9

(Continued)

FOREIGN PATENT DOCUMENTS

EP       1187440 A2 *  3/2002  ............ G10L 15/18
EP    3 525 107 A1     8/2019

OTHER PUBLICATIONS

Y. Wang, W. Rong, Y. Ouyang and Z. Xiong, "Augmenting Dialogue Response Generation With Unstructured Textual Knowledge," in IEEE Access, vol. 7, pp. 34954-34963, 2019, doi: 10.1109/ACCESS.2019.2904603. (Year: 2019).*

(Continued)

Primary Examiner — Bharatkumar S Shah
(74) Attorney, Agent, or Firm — Maschoff Brennan

(57) ABSTRACT

A method may include obtaining a dialogue of a user and a pre-trained language model. The method may include obtaining a corpus of dialogues and a corpus of response materials. The method may include modifying the pre-trained language model. The method may include identifying a dialogue topic of the dialogue of the user and identifying a set of response topics. The method may include selecting a set of response materials from the corpus of response materials. The method may include determining a first plurality of probabilities and, for each response material of the set of response materials, a respective second plurality of probabilities. The method may include comparing the first plurality of words with each respective second plurality of words associated with each respective response material of the set of response materials. The method may include selecting a response material of the set of response materials based on the comparison.

20 Claims, 4 Drawing Sheets

(51) Int. Cl.
  *G10L 15/06* (2013.01)
  *G10L 15/10* (2006.01)
  *G10L 15/08* (2006.01)

(52) U.S. Cl.
  CPC ...... *G10L 15/22* (2013.01); *G10L 2015/0635* (2013.01); *G10L 2015/0638* (2013.01); *G10L 2015/088* (2013.01); *G10L 2015/225* (2013.01)

(58) Field of Classification Search
  CPC ....... G10L 2015/0638; G10L 2015/088; G10L 2015/225
  USPC ........................................................ 704/257
  See application file for complete search history.

(56) References Cited

U.S. PATENT DOCUMENTS

| | | | | |
|---|---|---|---|---|
| 2018/0210874 | A1* | 7/2018 | Fuxman | G06V 20/35 |
| 2020/0074984 | A1* | 3/2020 | Ho | G10L 15/063 |
| 2020/0175961 | A1* | 6/2020 | Thomson | G06F 21/6245 |
| 2020/0312311 | A1* | 10/2020 | Bodenstab | G06F 40/279 |
| 2020/0395008 | A1* | 12/2020 | Cohen | G06F 40/205 |
| 2021/0141820 | A1* | 5/2021 | Vora | G06F 16/3344 |

OTHER PUBLICATIONS

P. Wickts at. al. "Sharing Health Data for Better Outcomes on PatientsLikeMe" Journal of Medical Internet Research Jun. 14, 2010.
A. Baumel et al. "Digital Peer-Support Platform as an Adjunct Treatment for Women With Postpartum Depression: Feasibility, Acceptability, and Preliminary Efficacy Study." PubMed; vol. 6(2); Feb. 13, 2018.
K. Kara Fitzpatrik et al. "Delivering Cognitive Behavior Therapy to Young Adults With Symptoms of Depression and Anxiety Using a Fully Automated Conversational Agent (Woebot): A Randomized Controlled Trial" JMIR Ment Health; Jun. 6, 2017.
Morris et al. "Towards an Artificially Empathic Conversational Agent for Mental Health Applications: System Design and User Perceptions" Journal of Medical Internet Research vol. 20, iss. 6, 10148; Jun. 26, 2018.
Tim Althoff et al. "Large-scale Analysis of Counseling Conversations: An Application of Natural Language Processing to Mental Health" ACL Anthology; May 2016.
Karthik Dinakar et al. "Mixed-Initiative Real-Time Topic Modeling and Visualization for Crisis Counseling" IUI; Mar. 2015.
Devlin et al. "BERT: Pre-training of Deep Bidirectional Transformers for Language Understanding" NAACL; May 24, 2019.
Z. Yang et al. "XLNet: Generalized Autoregressive Pretraining for Language Understanding" ArXiv; Jun. 19, 2019.
Diyi Yang et al. "Humor recognition and humor anchor extraction" In Proceedings of the 2015 Conference on Empirical Methods in Natural Language Processing, pp. 2367-2376; Sep. 2015.
Chen et al. "Humor recognition using deep learning" Proceedings of the 2018 Conference of the North American Chapter of the Association for Computational Linguistics: Human Language Technologies, vol. 2 (Short Papers; NAACL; Jun. 2018.
R. Mihalcea et al. "Making Computers Laugh: Investigations in Automatic Humor Recognition" Proceedings of the conference on Human Language Technology and Empirical Methods in Natural Language Processing; pp. 531-538; Oct. 2005.
Gultchin et al. "Humor in Word Embeddings: Cockamamie Gobbledegook for Nincompoops" ICML; May 24, 2019.
EP Search Report in Application No. 20209786.1 dated May 11, 2021.
Oh et al., "A Chatbot for Psychiatric Counseling in Mental Healthcare Service Based on Emotional Dialogue Analysis and Sentence Generation" 2017 IEEE 18th International Conference on Mobile Data Management, May 29, 2017.
Fitzpatrick et al., "Delivering Cognitive Behavior Therapy to Young Adults With Symptoms of Depression and Anxiety Using a Fully Automated Conversational Agent (Woebot): A Randomized Controlled Trial" JMIR Mental Health, vol. 4, iss. 2, Jun. 6, 2017.
Park et al., "Conversation Model Fine-Tuning for Classifying Client Utterances in Counseling Dialogues" Mar. 31, 2019.

* cited by examiner

RECOMMENDING MULTIMEDIA BASED ON USER UTTERANCES

FIELD

The embodiments discussed in the present disclosure are related to recommending multimedia based on user utterances.

BACKGROUND

Identifying appropriate responses to user utterances may be difficult without training labels. Various multimedia may be used to respond to user utterances and may be relevant to address concerns noted in user utterances. Various methods and systems may be used in an attempt to identify potential responses to user utterances to appropriately respond to the emotional and/or topical nature of user utterances.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

A method may include obtaining a dialogue of a user. The dialogue may include a first plurality of words. The method may also include obtaining a pre-trained language model. The method may further include obtaining a corpus of dialogues. The corpus of dialogues may include a plurality of communications between individuals. The corpus of dialogues may not include training labels. The method may include obtaining a corpus of response materials. The corpus of response materials may include potential responses to a communication of an individual. Each response material of the corpus of response materials may be associated with a respective second plurality of words. The corpus of response materials may not include training labels. The method may further include modifying the pre-trained language model using the corpus of dialogues and the corpus of response materials to identify topics of dialogues based on the corpus of dialogues and to identify responses to dialogues based on the corpus of response materials. The method may also include identifying a dialogue topic of the dialogue of the user using the modified language model. The method may further include identifying a set of response topics using the modified language model. Each response topic of the set of response topics may correspond to a respective response material of the corpus of response materials. The method may also include selecting a set of response materials from the corpus of response materials. Each respective response material of the set of response materials may be selected based on a respective response topic corresponding with the respective response material matching the dialogue topic. The method may further include determining a first plurality of probabilities. Each respective probability of the first plurality of probabilities may correspond to a probability of occurrence of each respective word in the first plurality of words based on the modified language model. The method may also include, for each response material of the set of response materials, determining a respective second plurality of probabilities. Each respective probability of the respective second plurality of probabilities may correspond to a probability of occurrence of each word in each respective second plurality of words associated with each respective response material of the set of response materials based on the modified language model. The method may further include comparing the first plurality of words with each respective second plurality of words associated with each respective response material of the set of response materials to determine a similarity between the first plurality of words and each respective second plurality of words. The method may also include selecting a response material of the set of response materials based on the comparison and based on the first plurality of probabilities and the respective second plurality of probabilities corresponding with the response material.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Example embodiments will be described and explained with additional specificity and detail through the use of the accompanying drawings in which.

DESCRIPTION OF EMBODIMENTS

Some embodiments described in the present disclosure relate to methods and systems of recommending multimedia based on user utterances. Mental health is a widespread issue in the world. Many individuals suffer from depression, which may lead to suicide. Traditionally, individuals have met with counselors to try to work through mental health issues. However, with increasing numbers of individuals seeking access to mental health professionals and social stigma often associated with using mental health services, other avenues may be beneficial to address the growing mental health problem across the world.

When a user desires to seek help with mental health issues, one or more embodiments of the present disclosure may identify multimedia to be presented to the user. In some embodiments, the identified multimedia may include jokes, images, videos, sound clips, and/or other media. The identified multimedia may help make the user feel better. The identified multimedia may help redirect the user's attention towards other things. Alternatively or additionally, in some embodiments, the identified multimedia may be presented to a human operator (such as a counselor) to help the counselor respond to the user. In these and other embodiments, the counselor may be able to respond to more users.

Various embodiments of the present disclosure may include the use of unlabeled training data. Using unlabeled training data may reduce the cost and/or the time required to develop a machine learning model. Alternatively or additionally, using unlabeled training data may more approximately simulate actual human learning.

Embodiments of the present disclosure are explained with reference to the accompanying drawings.

Figure 1:
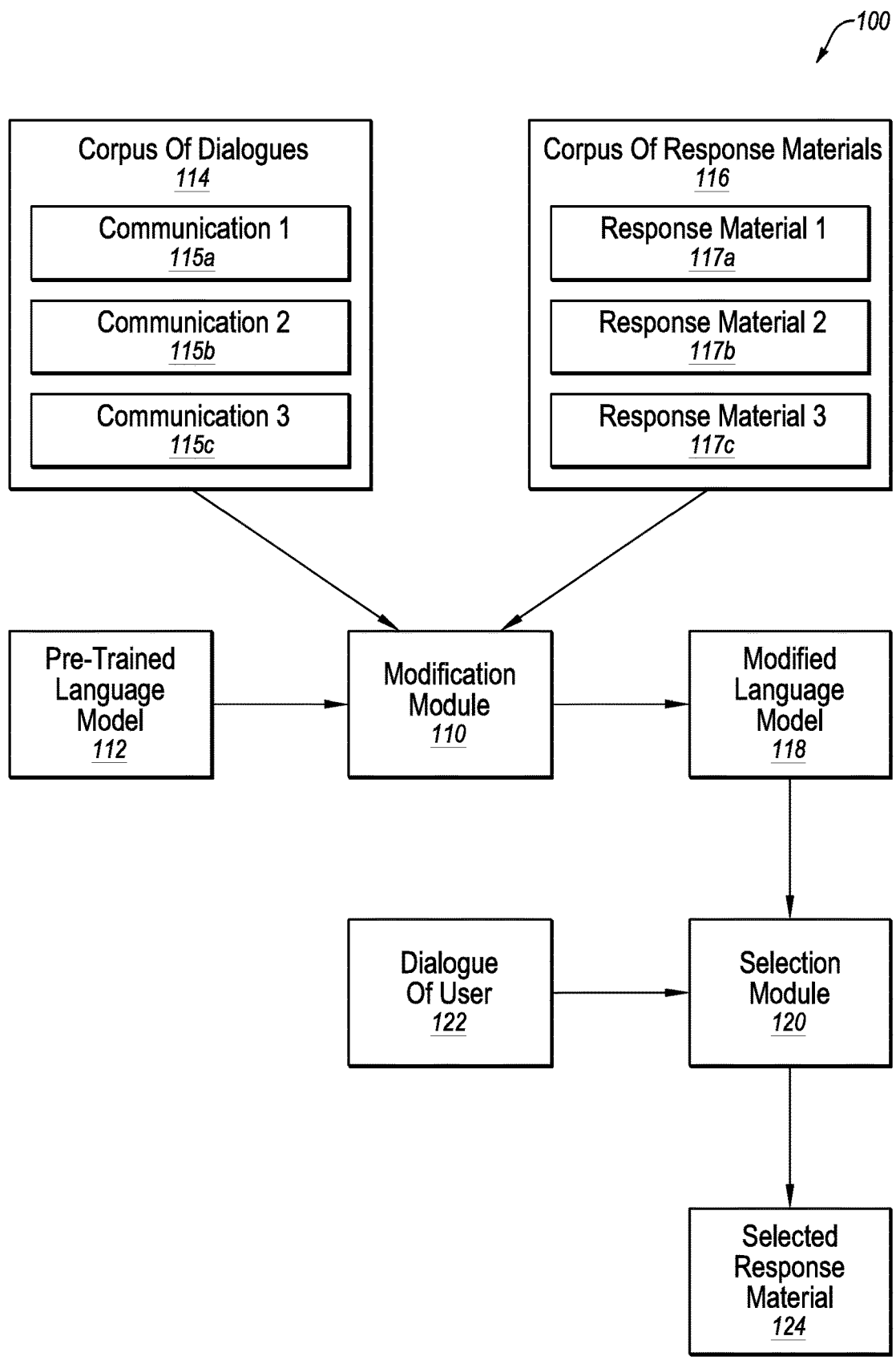
FIG. 1 is a diagram representing an example environment related to recommending multimedia based on user utterances.

FIG. 1 is a diagram representing an example environment 100 related to recommending multimedia based on user utterances, arranged in accordance with at least one embodiment described in the present disclosure. The environment 100 may include a modification module 110 and a selection module 120.

The modification module 110 may include code and routines configured to enable a computing device to perform one or more operations with respect to the pre-trained language model 112 to obtain the modified language model 118. Additionally or alternatively, the modification module 110 may be implemented using hardware including a processor, a microprocessor (e.g., to perform or control performance of one or more operations), a field-programmable gate array (FPGA), or an application-specific integrated circuit (ASIC). In some other instances, the modification module 110 may be implemented using a combination of hardware and software. In the present disclosure, operations described as being performed by the modification module 110 may include operations that the modification module 110 may direct a corresponding system to perform.

In some embodiments, the modification module 110 may obtain a pre-trained language model 112. In some embodiments, the modification module 110 may obtain the pre-trained language model 112 via one or more networks. In some embodiments, the pre-trained language model 112 may be a model that has been trained on a large amount of text. Examples of pre-trained language models 112 may include Bidrectional Encoder Representations from Transformers (BERT) and XLNet. BERT may attempt to understand text by reconstructing the original data from an input where certain tokens are randomly replaced by a "mask" token. XLNet may use context words to predict the next word. In some embodiments, it may use a permutation-based objective and may look at all or many possible permutations. In some embodiments, the context for predicting a current token may be all the words that come in the permutation before it. Thus, in some embodiments, pre-training may include a generalized training using a large amount of text. The modification module 110 may then modify (e.g., fine-tune as used in machine learning processes) the pre-trained language model 112 using a particular, smaller language data set such as corpus of dialogues 114 and the corpus of response materials 116.

In some embodiments, the pre-trained language model 112 may be trained on a large data group of English text. For example, the pre-trained language model 112 may be trained using one or more websites and one or more books. In these and other embodiments, no labeled training data may be required as, for example, with XLNet the model learns to predict the current word of a sentence given previous words.

In some embodiments, using labeled training data may increase the accuracy and robustness of a machine learning model. However, obtaining labeled training may be difficult, expensive, time-consuming, or otherwise infeasible. Additionally, in some contexts, manual labeling of training data may introduce subjectivity and biases of the human annotators, which may make the resulting labels unreliable. The absence of training labels may pose challenges to training machine learning models as training without labels may not be robust. By using training data without labels, a machine learning model may be created without the need for costly labeled training data. Additionally, using training data without labels may more approximately simulate the learning of humans.

In some embodiments, the modification module 110 may also obtain a corpus of dialogues 114. In general, the corpus of dialogues 114 may be a collection of text associated with dialogue between individuals. The corpus of dialogues 114 may include multiple communications 115, such as communication 1 115A, communication 2 115B, and communication 3 115C. While three communications 115 are depicted, the corpus of dialogues 114 may include any number of communications 115. The corpus of dialogues 114 may be a collection of text associated with dialogues and/or communications between individuals. For example, the communication 1 115A may be the script of a television show, the communication 2 115B may be a transcription of a conversation between two or more people, and the communication 3 115C may be transcripts of telephone conversations. Alternatively or additionally, the communications 115 may include other sources of dialogues. For example, the communication 1 115A may be the script of a first television show, the communication 2 115B may be the script of a second television show, and the communication 3 115C may be the script of a movie.

In some embodiments, the modification module 110 may also obtain a corpus of response materials 116. In general, the corpus of response materials 116 may be a collection of multimedia that may be used to respond to dialogue from an individual. The corpus of response materials 116 may include multiple response materials 117, such as response material 1 117A, response material 2 117B, and response material 3 117C. While three response materials 117 are depicted, the corpus of response materials 116 may include any number of response materials 117. The response materials 117 may include jokes, images, videos, sounds, inspirational quotes, proverbs, advice, anecdotes, etc., that may be used to respond to a dialogue of a user. For example, in some embodiments, the response materials 116 may be different jokes such that the response material 1 117A is a first joke, the response material 2 117B is a second joke, and the response material 3 117C is a third joke. In some embodiments, each of the response materials 117 may include a rating of the response materials 117. For example, if the response material 117A is a joke, the rating of the response material 117A may be a "funniness" rating of the joke. In some embodiments. Alternatively or additionally, if the response material 117B is an inspirational quote, the rating of the response material 117B may be an "inspiration level" rating of the inspirational quote. The ratings may be quantitative and/or qualitative measures of the response materials 117.

In some embodiments, the corpus of dialogues 114 may be unrelated to and/or distinct from the corpus of response materials 116. That is, the response materials 117 of the corpus of response materials 116 may not be intended and/or written specifically to respond to the communications 115 of the corpus of dialogues 114.

In some embodiments, the modification module 110 may be configured to modify (e.g., fine-tune) the pre-trained language model 112 using the corpus of dialogues 114 and the corpus of response materials 116. In some embodiments, the modification module 110 may modify the pre-trained language model 122 by fine-tuning the pre-trained language model 112 for a specified number of steps, for example, five thousand steps. In these and other embodiments, modifying the pre-trained language model 112 may be performed in the same or similar manner as the initial training of the language model but using a different data set. For example, training the language model may use a large data set that is not particular to any application while modifying the pre-trained language model by fine-tuning the pre-trained language model may use a smaller data set that is tailored to a particular application. For example, as described above, pre-trained language model 112 may predict what word should follow a given word based on context words. The prediction and model may be based on a large group of language data and may not be directed to a particular type of language. Thus, a smaller sample of a particular type of language, such as dialogues, may be used to improve the predictive behavior of the pre-trained language model 112 when employed in a context using the particular type of language. Thus, the modification module 110 may perform similar steps as a training module performed in creating the pre-trained language model 112 but may use a different training data set.

By modifying the pre-trained language model 112, the pre-trained language model 112 may adjust its predictive behavior to be better suited for dialogues and response materials. The modification module 110 may obtain a modified language model 118 by modifying (e.g., fine-tuning) the pre-trained language model 112.

The selection module 120 may include code and routines configured to enable a computing device to perform one or more operations with respect to the modified language model 118 to obtain the selected response material 124. Additionally or alternatively, the selection module 120 may be implemented using hardware including a processor, a microprocessor (e.g., to perform or control performance of one or more operations), a field-programmable gate array (FPGA), or an application-specific integrated circuit (ASIC). In some other instances, the selection module 120 may be implemented using a combination of hardware and software. In the present disclosure, operations described as being performed by the selection module 120 may include operations that the selection module 120 may direct a corresponding system to perform.

In some embodiments, the modification module 110 and the selection module 120 may be part of a single device. Alternatively or additionally, in some embodiments, the modification module 110 and the selection module 120 may be implemented as software. For example, the modification module 110 and the selection module 120 may be programmed as different modules in a software program.

The selection module 120 may be configured to select a response material 117 of the corpus of response materials 116. In some embodiments, the selection module 120 may obtain the modified language model 118 from the modification module 110. In some embodiments, the selection module 120 may also obtain a dialogue of a user 122. In some embodiments, the dialogue of the user 122 may include text received from a user via a network such as the internet. For example, the dialogue of the user may correspond with text the user enters into a chat box such as a chat through a website or an application. Alternatively or additionally, in some embodiments, the dialogue of the user may be a transcription of a phone call placed by the user or directed towards the user.

In some embodiments, the selection module 120 may obtain the selected response material 124 based on the modified language model 118, the corpus of response materials 116, and the dialogue of the user 122. In these and other embodiments, the selected response material 124 may be one of the response materials 117. Additional details of the operation of the selection module 120 are described below relative to FIG. 2.

A description of the operation of environment 100 follows. The modification module 110 may obtain the pre-trained language model 112, the corpus of dialogues 114 and the corpus of response materials 116. The modification module 110 may then generate the modified language model 118 by modifying (e.g., fine-tuning) the pre-trained language model 112 using the corpus of dialogues 114 and the corpus of response materials 116. In some embodiments, the modification module 110 may generate the modified language model 118 periodically such as, for example, when the pre-trained language model 112 is updated and/or in response to obtaining a new corpus of response materials 116.

A user may engage in a dialogue. For example, the user may enter text into a chat window and/or participate in an audio or video call with a mental health professional. The selection module 120 may obtain the dialogue of the user 122. The selection module 120 may then select a particular response material of the corpus of response materials 116 based on the dialogue of the user 122, the modified language model 118, and the corpus of response materials 116. In some embodiments, the selection module 120 may select a response material multiple times over the course of receiving dialogue of the user 122. For example, the selection module 120 may select a first response material at a first point in time in response to a first dialogue of the user 122 and may select a second response material at a second point in time in response to a second dialogue of the user 122. That is, the selection module 120 may identify multiple response materials during the course of a single conversation with the user. Alternatively or additionally, the selection module 120 may select a first response material in response to obtaining a dialogue from a first user 122 and may select a second response material in response to obtaining a dialogue from a second user 122.

In some embodiments, some elements of the environment 100 may change over time. For example, the corpus of response materials 116, the modified language model 118, and/or the dialogue of the user 122 may change over time. For example, the modification module 110 may obtain multiple corpora of response materials 116 and correspondingly generate multiple modified language models 118. For example, one corpus of response materials 116 may include jokes, another corpus of response materials 116 may include proverbs, and another corpus of response materials 116 may include images. The modification module 110 may generate a modified language model 118 associated with the jokes corpus of response materials 166, a modified language model 118 associated with the proverbs corpus of response materials 116, and a modified language model 118 associated with the images corpus of response materials 116.

The selection module 120 may be configured to select a response material depending on different characteristics of the user and/or the dialogue of the user 122. For example, in some embodiments, the user may indicate that the user prefers proverbs over jokes. Based on the identified user preference, the selection module 120 may select as a response material a proverb based on a modified language model 118 associated with a corpus of response materials 116 including proverbs. Additionally or alternatively, in some embodiments, the selection module 120 may estimate a user's preference based on the dialogue of the user 122 and/or based on other characteristics of the user.

Modifications, additions, or omissions may be made to FIG. 1 without departing from the scope of the present disclosure. For example, the environment 100 may include more or fewer elements than those illustrated and described in the present disclosure. Moreover, in some embodiments, the modification module 110 and the selection module 120 may be one module. Alternatively or additionally, in some embodiments, the modification module 110 and the selection module 120 and the operations discussed relative to the modification module 110 and the selection module 120 may be distributed across different systems.

Figure 2:
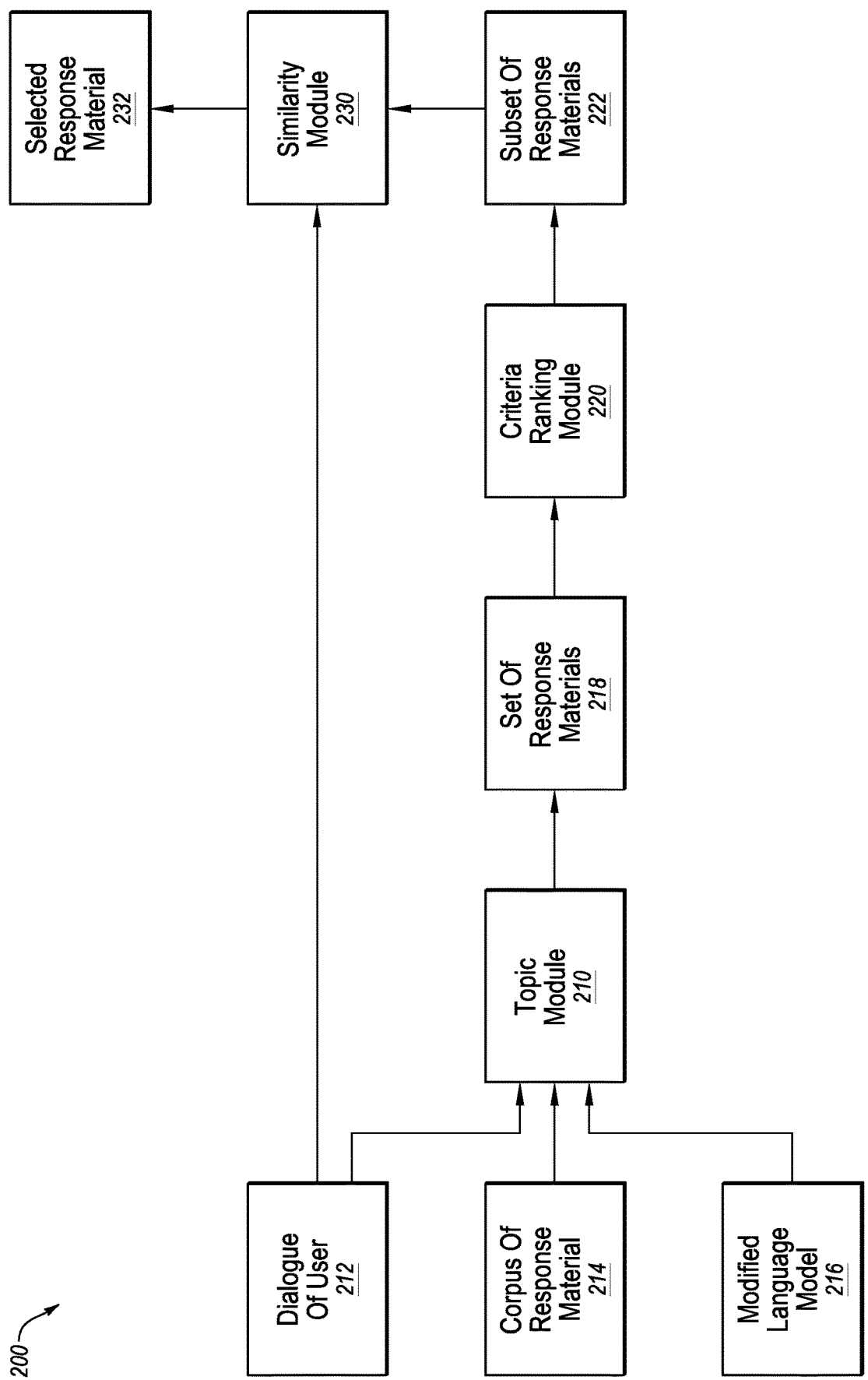
FIG. 2 illustrates an example selection module related to recommending multimedia based on user utterances.

FIG. 2 illustrates an example selection module 200 related to recommending multimedia based on user utterances. In some embodiments, the selection module 200 may correspond to the selection module 120 of FIG. 1. As is illustrated in FIG. 2, the selection module may include a topic module 210, a criteria ranking module 220, and a similarity module 230.

The topic module 210 may include code and routines configured to enable a computing device to perform one or more operations with respect to the dialogue of the user 212, the corpus of response materials 214, and the modified language model 216 to obtain the set of response materials 218. Additionally or alternatively, the topic module 210 may be implemented using hardware including a processor, a microprocessor (e.g., to perform or control performance of one or more operations), a field-programmable gate array (FPGA), or an application-specific integrated circuit (ASIC). In some other instances, the topic module 210 may be implemented using a combination of hardware and software. In the present disclosure, operations described as being performed by the topic module 210 may include operations that the topic module 210 may direct a corresponding system to perform.

In some embodiments, the topic module 210 may be configured to obtain a dialogue of a user 212. The dialogue of the user 212 may be similar to the dialogue of the user 122 of FIG. 1. In some embodiments, the topic module 210 may obtain the dialogue of the user 212 via one or more networks. In some embodiments, the topic module 210 may be configured to obtain a corpus of response materials 214. The corpus of response materials may be similar to the corpus of response materials 116 of FIG. 1. In some embodiments, the topic module 210 may obtain the corpus of response materials 214 via one or more networks. In some embodiments, the topic module 210 may obtain a modified language model 216. The modified language model 216 may be similar to the modified language model 118 of FIG. 1 and may include a fine-tuned language model. In some embodiments, the corpus of response materials 214 and the modified language model 216 may be combined and/or the corpus of response materials 214 may be part of the modified language model 216. In some embodiments, the topic module 210 may obtain the modified language model 216 from a modification module such as the modification module 110 of FIG. 1.

In some embodiments, the topic module 210 may be configured to identify a set of response materials 218. Each response material of the set of response materials 218 may be a response material included in the corpus of response materials. In some embodiments, the topic module 210 may identify a topic associated with each response material of the corpus of response materials 214 and a topic associated with the dialogue of the user 212. In these and other embodiments, the topic module 210 may identify a topic associated with a text based on the modified language model 216.

For example, in instances in which the modified language model 216 is a fine-tuned XLNet model, the topic module 210 may obtain an XLNet text embedding of the dialogue of the user 212 and an XLNet text embedding of each response material of the corpus of response materials 214. A text embedding may capture the main ideas of the dialogue of the user 212 and each response material of the corpus of response materials 214. In some embodiments, the topic module 210 may identify the set of response materials 218 by comparing topics of each response material of the corpus of response materials 214 with the topic of the dialogue of the user 212. In these and other embodiments, the topic module 210 may perform a nearest neighbor approach on the embeddings of the dialogue of the user 212 and each response material of the corpus of response materials 214. For example, the topic module 210 may perform a Facebook AI Similarity Search (FAISS) to identify the response materials of the corpus of response materials 214 that have embeddings closest to the dialogue of the user 212. In some embodiments, the topic module 210 may select the closest 10 response materials, the closest 20 response materials, the closest 30 response materials, the closest 50 response materials, the closest 100 response materials, or any number of response materials as the set of response materials 218.

The criteria ranking module 220 may include code and routines configured to enable a computing device to perform one or more operations with respect to the set of response materials 218 to obtain the subset of response materials 222. Additionally or alternatively, the criteria ranking module 220 may be implemented using hardware including a processor, a microprocessor (e.g., to perform or control performance of one or more operations), a field-programmable gate array (FPGA), or an application-specific integrated circuit (ASIC). In some other instances, the criteria ranking module 220 may be implemented using a combination of hardware and software. In the present disclosure, operations described as being performed by the criteria ranking module 220 may include operations that the criteria ranking module 220 may direct a corresponding system to perform.

In some embodiments, the criteria ranking module 220 may be configured to obtain the set of response materials 218 from the topic module 210. In these and other embodiments, the criteria ranking module 220 may be configured to order the response materials of the set of response materials 218 based on one or more criteria associated with the response materials. In some embodiments, the one or more criteria may include a ranking or rating of response material. For example, if the response materials of the corpus of response materials 216 are jokes, a first criteria may include a "funniness" of each joke. Alternatively or additionally, a second criteria may include an "age-appropriateness" of each joke. If the response materials of the corpus of response materials 216 are proverbs or inspirational quotes, a first criteria may include an "insightfulness" of each proverb or an "inspiration level" of each inspirational quote. In some embodiments, the one or more criteria may be obtained from user reviews such as, for example, reviews on websites. In some embodiments, the criteria associated with the response materials may be determined through user reviews, such as reviews on a website.

In some embodiments, the criteria ranking module 220 may sort each response material of the set of response materials based on the one or more criteria. In some embodiments, the response materials may be sorted into groups based on the response materials satisfying or not satisfying a threshold associated with the criteria. Referring back to the example where the response materials are jokes, the response materials may be rated on a "funniness" scale of one to five by users. The "funniness" threshold may be a rating of three on the scale. Response materials with a rating greater than or equal to three may be considered "funny" while response materials with a rating less than three may be considered "unfunny." In some embodiments, the criteria ranking module 220 may select the response materials of the set of response materials that are determined to be "funny"

as a subset of response materials 222. Additionally or alternatively, in some embodiments, the criteria ranking module 220 may select a particular number of response materials as the subset of response materials 222 based on the one or more criteria. For example, the set of response materials 218 may include thirty response materials and the criteria ranking module 220 may select twenty of the thirty response materials as the subset of response materials 222 based on the one or more criteria.

In some embodiments, the criteria ranking module 220 may include a machine learning classifier which may be trained to rank or categorize the response materials based on the one or more criteria. For example, the machine learning classifier may compare response materials that do not include labeled criteria with response materials that do include labeled criteria to estimate the criteria for the response materials without labeled criteria. In some embodiments, the criteria ranking module 220 may use a nearest neighbor search classifier to identify the closest jokes based on a user dialogue. In some embodiments, the criteria ranking module 220 may use FAISS to perform a search of the nearest neighbor that is scalable to large datasets.

The similarity module 230 may include code and routines configured to enable a computing device to perform one or more operations with respect to the subset of response materials 222 to obtain the selected response material 232. Additionally or alternatively, the similarity module 230 may be implemented using hardware including a processor, a microprocessor (e.g., to perform or control performance of one or more operations), a field-programmable gate array (FPGA), or an application-specific integrated circuit (ASIC). In some other instances, the similarity module 230 may be implemented using a combination of hardware and software. In the present disclosure, operations described as being performed by the similarity module 230 may include operations that the similarity module 230 may direct a corresponding system to perform.

In some embodiments, the similarity module 230 may be configured to obtain the subset of response materials 222 from the criteria ranking module 220. In some embodiments, the similarity module 230 may be configured to obtain the dialogue of the user 212. In these and other embodiments, the similarity module 230 may be configured to select a particular response material of the subset of response materials 222 as a selected response material 232. In these and other embodiments, the similarity module 230 may be configured to identify how closely related each response material of the subset of response materials 222 is to the dialogue of the user 212.

In some embodiments, the similarity module 230 may be configured to compare the dialogue of the user 212 with each of the response materials of the subset of response materials 222. In some embodiments, the similarity module 230 may determine an attention score associated with each word in the dialogue of the user 212. In these and other embodiments, an attention score may be a probability of occurrence of a word. For example, each word in the dialogue of the user may have an attention score corresponding to a probability of occurrence of the word. Similarly, each word in each response material of the subset of response materials 222 may have an attention score corresponding to a probability of occurrence of the word.

The similarity module 230 may be configured to compute a cosine similarity between each combination of words between the dialogue of the user 212 and the subset of response materials 222. For example, the similarity module 230 may be configured to determine a cosine similarity from word2Vec embeddings to determine the similarity of each combination of words. Alternatively or additionally, in some embodiments, the similarity module 230 may be configured to compute a cosine similarity between a subset of the words of the dialogue of the user 212 and subsets of the words of each response material of the subset of response materials 222. For example, the similarity module may 230 may identify the attention score for each word and may select the ten words with the highest attention score in each of the dialogue of the user 212 and each response material of the subset of response materials 222. The similarity module 230 may then compute the cosine similarity between each combination of words from the sets of selected ten words.

For each response material of the subset of response materials, the similarity module 230 may weight each cosine similarity by a corresponding attention score of a word of the dialogue of the user 212 and a corresponding attention score of a word of the particular response material. In some embodiments, the cosine similarity may be a distance between embeddings of each word. The similarity module may combine the weighted cosine similarities. In some embodiments, the similarity module 230 may normalize the combined weighted cosine similarities. In these and other embodiments, the similarity module 230 may select the response material of the subset of response materials with the highest combined weighted cosine similarity as the selected response material 232.

As an example, the dialogue of the user 212 may have two words: A and B. A first response material of the subset of response materials 222 may have two words: C and D. A second response material of the subset of response materials 222 may have three words: E, F, and G. The similarity module 230 may determine an attention score for each word in the dialogue of the user 212 and for each word in each response material of the subset of response materials 222: $AS_A$, $AS_B$, $AS_C$, $AS_D$, $AS_E$, $AS_F$, and $AS_G$, where AS represents the attention score for a particular word. In some embodiments, AS may be the probability that the particular word would occur. The similarity module 230 may also determine a similarity between each pairing of words between the dialogue of the user 212 and each of the response materials of the subset of response materials: for the first response material, $S_{AC}$, $S_{AD}$, $S_{BC}$, and $S_{BD}$; and for the second response material, $S_{AE}$, $S_{AF}$, $S_{AG}$, $S_{BE}$, $S_BF$, and $S_{BG}$, where S represents the similarity between two words. The similarity module 230 may then weight each similarity by the corresponding attention score of a word in the dialogue of the user 212 and the corresponding attention score of a word in each of the response materials of the subset of response materials, for example for the similarity between word A of the dialogue of the user and word C of the first response material: $AS_A \times AS_C \times S_{AC}$. The similarity module 230 may then combine the weighted similarities for a particular response material and may normalize the combined weighted similarities:

$$CWS_{N,RM_i} = \frac{\sum_D \sum_{RM_i} AS_D \times RM_i \times S_{Di}}{\text{number of words in } i}.$$

The similarity module 230 may then select the response material with the highest normalized combined weighted similarity.

Modifications, additions, or omissions may be made to FIG. 2 without departing from the scope of the present disclosure. For example, the selection module 200 may include more or fewer elements than those illustrated and described in the present disclosure. For example, in some embodiments, the selection module 200 may not include the criteria ranking module 220. In these and other embodiments, the similarity module 230 may obtain the set of response materials 218 from the topic module 210 and may determine attention scores and cosine similarities for the words in each response material of the set of response materials 218 in a manner analogous to that described above relative to the subset of response materials 222. Alternatively or additionally, in some embodiments, the selection module 200 may also include a presentation module. In these and other embodiments, the presentation module may be configured to present the selected response material 232 to a user and/or to an individual communicating with the user. Moreover, in some embodiments, the topic module 210, the criteria ranking module 220, and the similarity module 230 may be one module. Alternatively or additionally, in some embodiments, the topic module 210, the criteria ranking module 220, and the similarity module 230 and the operations discussed relative to the topic module 210, the criteria ranking module 220, and the similarity module 230 may be distributed across different systems.

Figure 3:
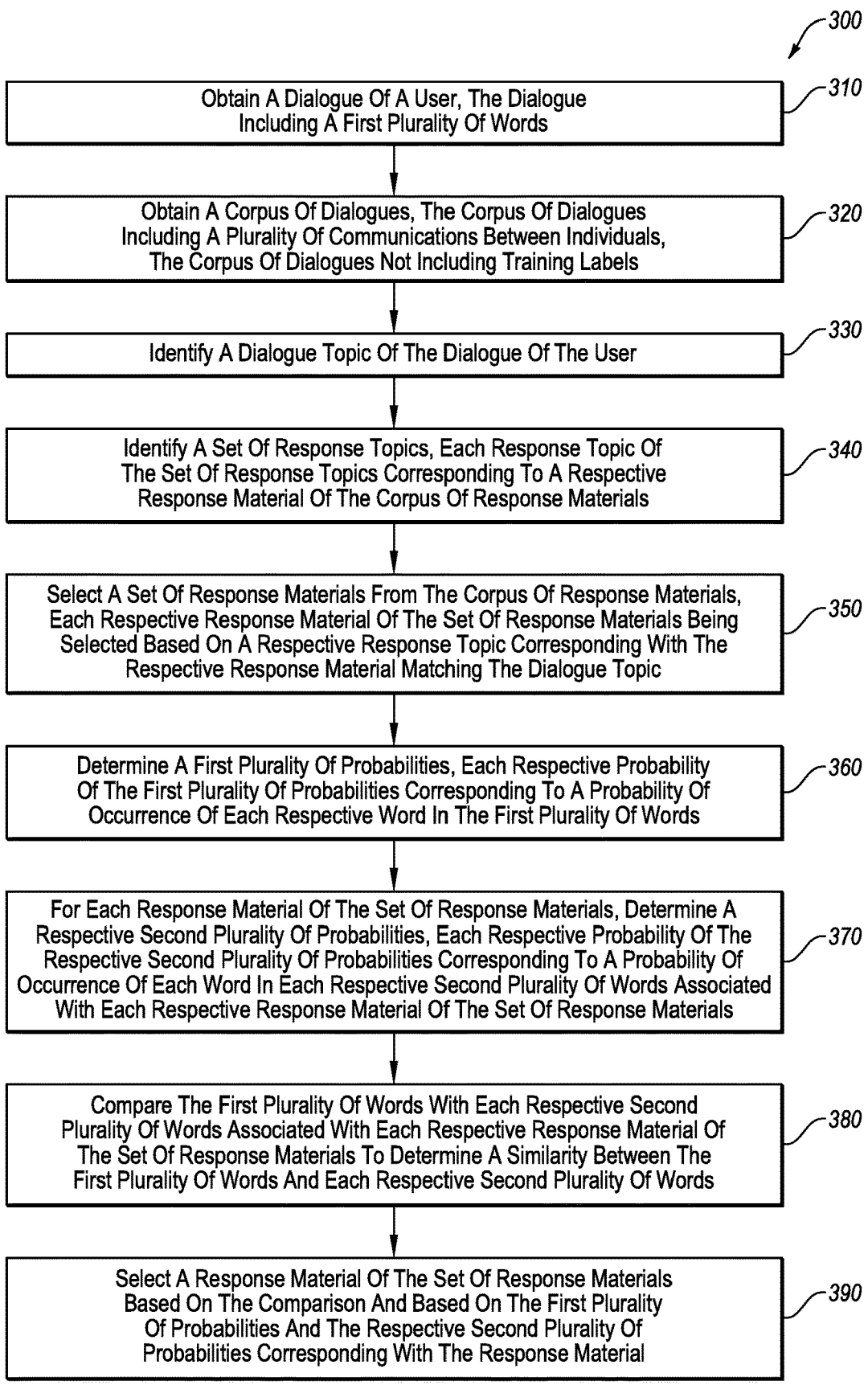
FIG. 3 is a flowchart of an example method of recommending multimedia based on user utterances.

FIG. 3 is a flowchart of an example method of recommending multimedia based on user utterances. The method 300 may be arranged in accordance with at least one embodiment described in the present disclosure. The method 300 may be performed, in whole or in part, in some embodiments, by a system and/or environment, such as the environment 100 and/or the computer system 402 of FIGS. 1 and 4, respectively. In these and other embodiments, the method 300 may be performed based on the execution of instructions stored on one or more non-transitory computer-readable media. Although illustrated as discrete blocks, various blocks may be divided into additional blocks, combined into fewer blocks, or eliminated, depending on the desired implementation.

The method 300 may begin at block 310, where a dialogue of a user may be obtained. The dialogue may include a first plurality of words. In some embodiments, the dialogue of the user may be the dialogue of a counseling session. In block 320, a corpus of response materials may be obtained. The corpus of response materials may include potential responses to a communication of an individual. Each response material of the corpus of response materials may be associated with a respective second plurality of words. In some embodiments, the response materials of the corpus of response materials may be jokes.

In block 330, a dialogue topic of the dialogue of the user may be identified. In block 340, a set of response topics may be identified. Each response topic of the set of response topics may correspond to a respective response material of the corpus of response materials.

In block 350, a set of response materials may be selected from the corpus of response materials. Each respective response material of the set of response materials may be selected based on a respective response topic corresponding with the respective response material matching the dialogue topic. In some embodiments, selecting the set of response materials may include identifying a set of distances. Each distance of the set of distances may correspond to a respective response topic of the set of response topics and may be a distance between the respective response topic and the dialogue topic. The distance may indicate a similarity between the respective response topic and the dialogue topic. The distances of the set of distances may be ranked.

A group of distances may be selected based on the ranking of the distances. Each respective response material of the set of response materials may be selected based on a respective distance corresponding with the respective response topic corresponding with the respective response material being in the group of distances.

In block 360, a first plurality of probabilities may be determined. Each respective probability of the first plurality of probabilities may correspond to a probability of occurrence of each respective word in the first plurality of words.

In block 370, a respective second plurality of probabilities may be determined for each response material of the set of response materials. Each respective probability of the respective second plurality of probabilities may correspond to a probability of occurrence of each word in each respective second plurality of words associated with each respective response material of the set of response materials.

In block 380, the first plurality of words may be compared with each respective second plurality of words associated with reach respective response material of the set of response materials to determine a similarity between the first plurality of words and each respective second plurality of words.

In block 390, a response material of the set of response materials may be selected based on the comparison and based on the first plurality of probabilities and the respective second plurality of probabilities corresponding with the response material. In some embodiments, selecting a response material of the set of response materials may include, for each response material of the set of response materials, for each combination of a first word of the first plurality of words and a second word in a respective second plurality of words associated with the response material, obtaining a similarity score and a weight. The weigh may be determined based on a probability of the first plurality of probabilities corresponding to the first word and a probability of a respective second plurality of probabilities corresponding to the second word. Each similarity score may be weighted by its respective weight. The weighted similarity scores may be combined to obtain an overall similarity score for the respective response material. A response material may be selected from the set of response materials based on a respective overall similarity score for the response material.

One skilled in the art will appreciate that, for this and other processes, operations, and methods disclosed herein, the functions and/or operations performed may be implemented in differing order. Furthermore, the outlined functions and operations are only provided as examples, and some of the functions and operations may be optional, combined into fewer functions and operations, or expanded into additional functions and operations without detracting from the essence of the disclosed embodiments. In some embodiments, the method 300 may include additional blocks or fewer blocks.

For example, in some embodiments, the method 300 may include obtaining a pre-trained language model. In these and other embodiments, the method 300 may further include obtaining a corpus of dialogues. The corpus of dialogues may include a plurality of communications between individuals. The corpus of dialogues may not include training labels. In these and other embodiments, the corpus of response materials may not include training labels. In these and other embodiments, the method 300 may also include modifying (e.g., fine-tuning) the pre-trained language model using the corpus of dialogues and the corpus of response materials to identify topics of dialogues based on the corpus of dialogues and to identify responses to dialogues based on the corpus of response materials. In these and other embodiments, the dialogue topic of the dialogue of the user may be identified using the modified language model. In these and other embodiments, the set of response topics may be identified using the modified language model. In these and other embodiments, the first plurality of probabilities may be determined based on the modified language model. In these and other embodiments, the respective second plurality of probabilities may be determined for each response material based on the modified language model.

Alternatively or additionally, in some embodiments, the method 300 may include presenting the selected response material to the user.

Alternatively or additionally, in some embodiments, the method 300 may include ranking the set of response materials based on a rating associated with the corpus of response materials. A subset of the response materials may be selected based on the ranking of the set of the response materials.

Figure 4:
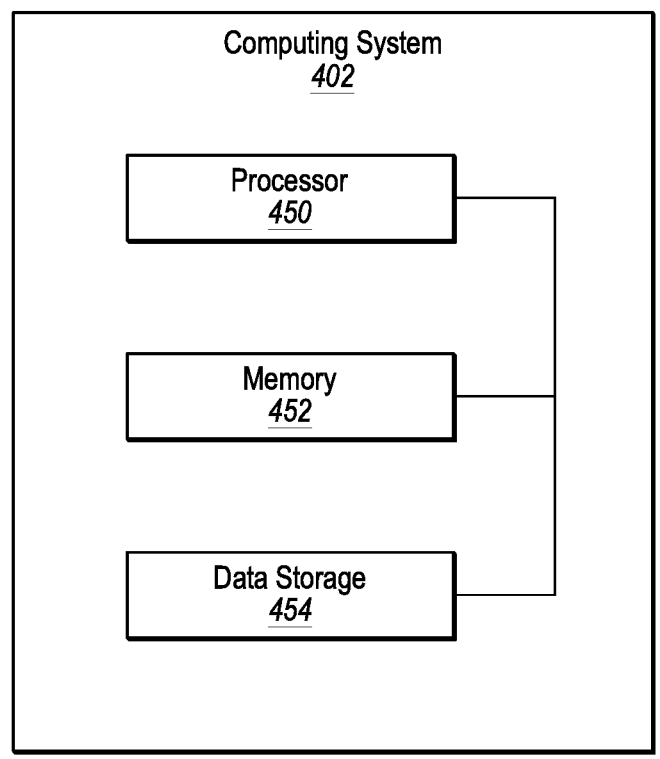
FIG. 4 illustrates an example computing system that may be configured to recommend multimedia based on user utterances.

FIG. 4 illustrates a block diagram of an example computing system 402, according to at least one embodiment of the present disclosure. The computing system 402 may be configured to implement or direct one or more operations associated with recommending multimedia based on user utterances. The computing system 402 may include a processor 450, a memory 452, and a data storage 454. The processor 450, the memory 452, and the data storage 454 may be communicatively coupled.

In general, the processor 450 may include any suitable special-purpose or general-purpose computer, computing entity, or processing device including various computer hardware or software modules and may be configured to execute instructions stored on any applicable computer-readable storage media. For example, the processor 450 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data. Although illustrated as a single processor in FIG. 4, the processor 450 may include any number of processors configured to, individually or collectively, perform or direct performance of any number of operations described in the present disclosure. Additionally, one or more of the processors may be present on one or more different electronic devices, such as different servers.

In some embodiments, the processor 450 may be configured to interpret and/or execute program instructions and/or process data stored in the memory 452, the data storage 454, or the memory 452 and the data storage 454. In some embodiments, the processor 450 may fetch program instructions from the data storage 454 and load the program instructions in the memory 452. After the program instructions are loaded into memory 452, the processor 450 may execute the program instructions.

For example, in some embodiments, the method 300 of FIG. 3 may be included in the data storage 454 as program instructions. The processor 450 may fetch the program instructions of the methods from the data storage 454 and may load the program instructions of the methods in the memory 452. After the program instructions of the methods are loaded into memory 452, the processor 450 may execute the program instructions such that the computing system may implement the operations associated with the methods as directed by the instructions.

The memory 452 and the data storage 454 may include computer-readable storage media for carrying or having computer-executable instructions or data structures stored thereon. Such computer-readable storage media may include any available media that may be accessed by a general-purpose or special-purpose computer, such as the processor 450. By way of example, and not limitation, such computer-readable storage media may include tangible or non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store particular program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 450 to perform a certain operation or group of operations.

Modifications, additions, or omissions may be made to the computing system 402 without departing from the scope of the present disclosure. For example, in some embodiments, the computing system 402 may include any number of other components that may not be explicitly illustrated or described.

As indicated above, the embodiments described in the present disclosure may include the use of a special-purpose or general-purpose computer (e.g., the processor 450 of FIG. 4) including various computer hardware or software modules, as discussed in greater detail below. Further, as indicated above, embodiments described in the present disclosure may be implemented using computer-readable media (e.g., the memory 452 or data storage 454 of FIG. 4) for carrying or having computer-executable instructions or data structures stored thereon.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the systems and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

The invention claimed is:

1. A method comprising:
    obtaining a dialogue of a user, the dialogue including a first plurality of words;
    obtaining a pre-trained language model;
    obtaining a corpus of dialogues, the corpus of dialogues including a plurality of communications between individuals, the corpus of dialogues not including training labels;
    obtaining a corpus of response materials, the corpus of response materials including potential responses to a communication of an individual, each response material of the corpus of response materials being associated with a respective second plurality of words, the corpus of response materials not including training labels;
    modifying the pre-trained language model using the corpus of dialogues and the corpus of response materials to identify topics of dialogues based on the corpus of dialogues and to identify responses to dialogues based on the corpus of response materials;
    identifying a dialogue topic of the dialogue of the user using the modified language model;
    identifying a set of response topics using the modified language model, each response topic of the set of response topics corresponding to a respective response material of the corpus of response materials;
    selecting a set of response materials from the corpus of response materials, each respective response material of the set of response materials being selected based on a respective response topic corresponding with the respective response material matching the dialogue topic, the selecting of the set of response materials including:
        identifying a set of distances, each distance of the set of distances corresponding to a respective response topic of the set of response topics and being a distance between the respective response topic and the dialogue topic, the distance indicating a similarity between the respective response topic and the dialogue topic;
        ranking the distances of the set of distances;
        selecting a group of distances based on the ranking of the distances; and
        selecting each respective response material of the set of response materials based on a respective distance corresponding with the respective response topic corresponding with the respective response material being in the group of distances;
    determining a first plurality of probabilities, each respective probability of the first plurality of probabilities corresponding to a probability of occurrence of each respective word in the first plurality of words based on the modified language model;
    for each response material of the set of response materials, determining a respective second plurality of probabilities, each respective probability of the respective second plurality of probabilities corresponding to a probability of occurrence of each word in each respective second plurality of words associated with each respective response material of the set of response materials based on the modified language model;
    comparing the first plurality of words with each respective second plurality of words associated with each respective response material of the set of response materials to determine a similarity between the first plurality of words and each respective second plurality of words; and
    selecting a response material of the set of response materials based on the comparison and based on the first plurality of probabilities and the respective second plurality of probabilities corresponding with the response material.

2. The method of claim 1, wherein the response materials of the corpus of response materials are jokes.

3. The method of claim 1, wherein the dialogue of the user is the dialogue of a counseling session.

4. The method of claim 1, wherein the selecting a response material of the set of response materials comprises:
    for each response material of the set of response materials:
        for each combination of a first word of the first plurality of words and a second word in a respective second plurality of words associated with the response material, obtaining a similarity score and a weight, the weight determined based on a probability of the first plurality of probabilities corresponding to the first word and a probability of a respective second plurality of probabilities corresponding to the second word;
        weighting each similarity score by its respective weight;

combining the weighted similarity scores to obtain an overall similarity score for the respective response material; and selecting a response material of the set of response materials based on a respective overall similarity score for the response material.

5. The method of claim 1, further comprising presenting the selected response material to the user.

6. The method of claim 1, wherein:
the pre-trained language model is trained using a general data set that is generally applicable to a plurality of language applications; and
modifying the pre-trained language model fine-tunes the pre-trained language model by using the corpus of dialogues and the corpus of response materials as a specific data set that is applicable to a dialogue based language application.

7. A non-transitory computer-readable medium having encoded therein programming code executable by a processor to perform operations comprising:
obtaining a dialogue of a user, the dialogue including a first plurality of words;
obtaining a corpus of response materials, the corpus of response materials including potential responses to a communication of an individual, each response material of the corpus of response materials being associated with a respective second plurality of words;
identifying a dialogue topic of the dialogue of the user;
identifying a set of response topics, each response topic of the set of response topics corresponding to a respective response material of the corpus of response materials;
selecting a set of response materials from the corpus of response materials, each respective response material of the set of response materials being selected based on a respective response topic corresponding with the respective response material matching the dialogue topic, the selecting of the set of response materials including:
identifying a set of distances, each distance of the set of distances corresponding to a respective response topic of the set of response topics and being a distance between the respective response topic and the dialogue topic, the distance indicating a similarity between the respective response topic and the dialogue topic;
ranking the distances of the set of distances;
selecting a group of distances based on the ranking of the distances; and
selecting each respective response material of the set of response materials based on a respective distance corresponding with the respective response topic corresponding with the respective response material being in the group of distances;
determining a first plurality of probabilities, each respective probability of the first plurality of probabilities corresponding to a probability of occurrence of each respective word in the first plurality of words;
for each response material of the set of response materials, determining a respective second plurality of probabilities, each respective probability of the respective second plurality of probabilities corresponding to a probability of occurrence of each word in each respective second plurality of words associated with each respective response material of the set of response materials;
comparing the first plurality of words with each respective second plurality of words associated with each respective response material of the set of response materials to determine a similarity between the first plurality of words and each respective second plurality of words; and selecting a response material of the set of response materials based on the comparison and based on the first plurality of probabilities and the respective second plurality of probabilities corresponding with the response material.

8. The non-transitory computer-readable medium of claim 7, wherein the response materials of the corpus of response materials are jokes.

9. The non-transitory computer-readable medium of claim 7, wherein the dialogue of the user is the dialogue of a counseling session.

10. The non-transitory computer-readable medium of claim 7, wherein the selecting a response material of the set of response materials comprises:
for each response material of the set of response materials:
for each combination of a word of the first plurality of words and a word in a respective second plurality of words associated with the response material, obtaining a similarity score and a weight, the weight determined based on a probability of the first plurality of probabilities corresponding to the first word and a probability of a respective second plurality of probabilities corresponding to the second word;
weighting each similarity score by its respective weight;
combining the weighted similarity scores to obtain an overall similarity score for the respective response material; and
selecting a response material of the set of response materials based on a respective overall similarity score for the response material.

11. The non-transitory computer-readable medium of claim 7, further comprising presenting the selected response material to the user.

12. The non-transitory computer-readable medium of claim 7, wherein the operations further comprise obtaining a pre-trained language model and wherein the identifying the dialogue topic of the dialogue of the user comprises identifying the dialogue topic of the dialogue of the user based on the pre-trained language model.

13. The non-transitory computer-readable medium of claim 7, wherein:
the pre-trained language model is trained using a general data set that is generally applicable to a plurality of language applications; and
modifying the pre-trained language model fine-tunes the pre-trained language model by using the corpus of dialogues and the corpus of response materials as a specific data set that is applicable to a dialogue based language application.

14. A system comprising:
one or more processors; and
one or more computer-readable media configured to store instructions that in response to being executed by the one or more processors cause the system to perform operations, the operations comprising:
obtaining a dialogue of a user, the dialogue including a first plurality of words;
obtaining a corpus of response materials, the corpus of response materials including potential responses to a communication of an individual, each response material of the corpus of response materials being associated with a respective second plurality of words;

identifying a dialogue topic of the dialogue of the user;

identifying a set of response topics, each response topic of the set of response topics corresponding to a respective response material of the corpus of response materials;

selecting a set of response materials from the corpus of response materials, each respective response material of the set of response materials being selected based on a respective response topic corresponding with the respective response material matching the dialogue topic, the selecting of the set of response materials including:
  identifying a set of distances, each distance of the set of distances corresponding to a respective response topic of the set of response topics and being a distance between the respective response topic and the dialogue topic, the distance indicating a similarity between the respective response topic and the dialogue topic;
  ranking the distances of the set of distances;
  selecting a group of distances based on the ranking of the distances; and
  selecting each respective response material of the set of response materials based on a respective distance corresponding with the respective response topic corresponding with the respective response material being in the group of distances;

ranking the set of response materials based on a rating associated with the corpus of response materials;

selecting a subset of the response materials based on the ranking of the set of response materials;

determining a first plurality of probabilities, each respective probability of the first plurality of probabilities corresponding to a probability of occurrence of each respective word in the first plurality of words;

for each response material of the subset of response materials, determining a respective second plurality of probabilities, each respective probability of the respective second plurality of probabilities corresponding to a probability of occurrence of each word in each respective second plurality of words associated with each respective response material of the subset of response materials;

comparing the first plurality of words with each respective second plurality of words associated with each respective response material of the subset of response materials to determine a similarity between the first plurality of words and each respective second plurality of words; and selecting a response material of the subset of response materials based on the comparison and based on the first plurality of probabilities and the respective second plurality of probabilities corresponding with the response material.

15. The system of claim 14, wherein the response materials of the corpus of response materials are jokes.

16. The system of claim 15, wherein the rating associated with the corpus of response materials includes a funniness of each response material of the set of response materials.

17. The system of claim 14, wherein the dialogue of the user is the dialogue of a counseling session.

18. The system of claim 14, wherein the selecting a response material of the subset of response materials comprises:
  for each response material of the subset of response materials:
    for each combination of a word of the first plurality of words and a word in a respective second plurality of words associated with the response material, obtaining a similarity score and a weight, the weight determined based on a probability of the first plurality of probabilities corresponding to the first word and a probability of a respective second plurality of probabilities corresponding to the second word;
    weighting each similarity score by its respective weight;
    combining the weighted similarity scores to obtain an overall similarity score for the respective response material; and
  selecting a response material of the subset of response materials based on a respective overall similarity score for the response material.

19. The system of claim 14, wherein the operations further comprise obtaining a pre-trained language model and wherein the identifying the dialogue topic of the dialogue of the user comprises identifying the dialogue topic of the dialogue of the user based on the pre-trained language model.

20. The system of claim 14, wherein:
  the pre-trained language model is trained using a general data set that is generally applicable to a plurality of language applications; and
  modifying the pre-trained language model fine-tunes the pre-trained language model by using the corpus of dialogues and the corpus of response materials as a specific data set that is applicable to a dialogue based language application.

* * * * *